(12) United States Patent
Stove et al.

(10) Patent No.: US 6,331,848 B1
(45) Date of Patent: *Dec. 18, 2001

(54) PROJECTION DISPLAY SYSTEM

(75) Inventors: Andrew G. Stove, Reigate (GB);
Ruediger Grewer, Schenefeld (DE);
Ingwer Carlsen, Kiel (DE); Heino Svensson, Hamburg (DE);
Karl-Juergan Moennich, Wedel (DE);
Joachim Schmidt; Thomas Wendler, both of Hamburg (DE)

(73) Assignee: U.S. Philips Corporation, New York, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/842,524

(22) Filed: Apr. 24, 1997

(30) Foreign Application Priority Data

Apr. 27, 1996 (GB) .................................................. 9608770

(51) Int. Cl.⁷ .................................................. G09G 5/00
(52) U.S. Cl. .................................................. 345/156; 345/158
(58) Field of Search .............................. 356/376; 345/156, 345/161, 157, 145, 158, 1; 353/122; 346/17; 348/760, 744, 88, 92, 734; 341/176; 362/259

(56) References Cited

U.S. PATENT DOCUMENTS

| | | | |
|---|---|---|---|
| 4,125,843 | * | 11/1978 | Whitby .................................. 346/17 |
| 5,085,502 | * | 2/1992 | Womack et al. ..................... 356/376 |
| 5,394,183 | | 2/1995 | Hyslop .................................. 348/88 |
| 5,422,693 | * | 6/1995 | Vogeley et al. ...................... 353/122 |
| 5,515,079 | * | 5/1996 | Hauck .................................. 345/157 |
| 5,712,658 | * | 1/1998 | Arita et al. ........................... 345/158 |
| 5,724,106 | * | 3/1998 | Autry et al. .......................... 348/734 |
| 5,859,623 | * | 1/1999 | Meyn et al. ............................. 345/1 |
| 5,914,783 | * | 6/1999 | Barrus .................................. 356/375 |

FOREIGN PATENT DOCUMENTS

0565300A2  10/1993  (EP) .............................. G06K/11/08

* cited by examiner

Primary Examiner—Richard Hjerpe
Assistant Examiner—Francis Nguyen

(57) ABSTRACT

A projection display system comprises a presentation computer (1) which generates images which are projected onto a screen (4) using a projector (3) controlled over a line (2) by the computer (1). A video camera (5) views the screen and a laser pointer (8) is supplied for pointing at the screen (4). An interaction computer (7) analyses the signal produced by the video camera (5) to determine the position of peak value in a frame to locate the point at which the laser pointer (5) is pointed. The laser pointer (6) is provided with buttons (10) which perform conventional computer mouse button functions. The state of the buttons (10) may be signalled to the computer (7) over an infra red link (9).

7 Claims, 2 Drawing Sheets

PROJECTION DISPLAY SYSTEM

FIELD OF THE INVENTION

The invention relates to a projection display system comprising a projector for projecting a computer generated display on to a screen.

Slide and overhead projections have for many years been an effective technique for making information available to a wide audience, for example in a conference. The availability of high quality video projectors allows for direct visualisation of computer display contents such as text, graphics, images etc. instead of the production of photographic slides or overhead transparencies. This technique can also handle multimedia information more conveniently than traditional approaches and consequently it is likely to play an increasingly important role in future presentations at conferences and the like.

During the presentation of a paper at a conference two major types of interaction have been identified. The first may be called a referring interaction such as pointing at projected objects and the second a managing interaction, that is accessing new images or going back to previously shown images. Traditionally referring to objects on a screen is done with a pointer, the pointer may either be a stick or more elegantly a laser pointer. The latter allows the speaker to point at the image projected from almost any place in the room and gives maximum flexibility for the task of referencing. For the managing interaction a turntable on a slide projector may be controlled or with overhead transparencies the presenter has to manually remove and replace the transparencies on the projector.

When working with a projection display system which projects computer generated images directly the same types of interaction are required. The first can again be achieved with a stick or laser pointer while the second requires access to the computer. Clearly the presenter could turn away to a small computer monitor and use its mouse during a presentation. This, however, gives reduced flexibility for the presenter as he has to look away from the projected image and go to a particular location to use the computer, thus taking his attention away from the audience and interrupting the presentation.

SUMMARY OF THE INVENTION

It is an object of the invention to enable the provision of a projection display system in which the presenter can with greater flexibility perform both the referring function and the managing function.

The invention provides a projection display system comprising a projector for projecting a computer generated display on to a screen, a pointer producing a narrow beam of radiation of higher intensity than the projected image, a video camera located in a fixed position relative to the projector and arranged to view the screen, and means for analysing the video signal produced by the camera to determine the point on the screen illuminated by the pointer.

By these means the computer is provided with information which enables it to determine where the pointer is pointed at on the screen. Since the computer can detect that the pointer is pointed at a particular object on the screen both the presentational interaction and the managing interaction may be achieved without the presenter having to turn away from the audience. In this specification higher intensity means the intensity as perceived by the video camera after any filtering of the image, if provided, and not as seen by an observer.

The pointer may be a laser pointer, which is a convenient source of high intensity radiation having a narrow beam width so that a small area of the screeen may be indicated.

The managing interaction, that is the control of the images to be displayed, may be achieved in a number of different ways. It may be arranged, for example, that the computer is arranged to produced soft buttons on the screen and by pointing the laser beam at the position of the button on the screen and maintaining it there for a given period of time may cause the button to be operated. The computer then performs the appropriate operation in response to the simulated button pressing. Such operations may be for example to cause a preceding or succeeding image to be displayed or to enlarge a particular portion of the image currently being displayed. Further operations which may be carried out are for example to bring up a menu on the screen and to select items from that menu.

The computer may be arranged to display a cursor at the determined point on the screen.

By this means the computer provides a feedback signal to the presenter which reassures the presenter that the pointer is pointed at the desired point on the screen. This also allows the use of a laser or other radiation source which produces radiation in the non-visible region of the spectrum, for example in the infra red region, where the presenter cannot actually see the position on the screen that the radiation beam is striking but when the cursor appears then the presenter knows where the laser beam is positioned.

The pointer may have one or more button(s), one button may be used to switch the radiation beam on and off while further buttons may be provided to enable similar facilities to that of a conventional computer mouse.

A wireless link may be provided between the pointer and the computer. This link, which may be an infra red link, enables the function of the "mouse buttons" to be transmitted to the computer. Of course a wired link may be provided between the pointer and the computer, but a wireless link allows the presenter greater freedom by not requiring a physical connection between the pointer and the computer. Thus the presenter may move around more freely in the lecture theatre when presenting the lecture. The wireless link may take many forms. An infra link is convenient as infra red transmitters and receivers are readily available as used in conventional television remote control devices. Examples of alternatives are radio or ultrasonics which may have advantages in given situations, for example in terms of radiation pattern emitted or absorption of the signals by intervening objects.

The projection display system may include geometrical distortion correction means to correct distortion caused by the projector screen and video camera. There will be some distortion caused by the optics of the projector which means that the projected image will not be precisely the same as that which would have appeared on a computer monitor screen. In addition if the projection screen is not perfectly aligned there will be further distortion and the video camera will normally be viewing the screen from a different position from that of the projector. While the video camera and projector may be built into one unit so that the physical locations are fixed this does not overcome the problem of possible screen misalignment. Consequently, unless such geometrical distortion correction means is included, the setting up of the projection display system has to be very precise in order that the position of the laser spot on the screen corresponds with that the computer has generated. If such correspondence is not maintained then clearly, depending on the degree of misalignment the operation of the projection system may be completely erroneous. For example the operation of a soft button may, when there are several soft buttons in relatively close proximity, entail the detection by the computer of a different button from that which the presenter thinks the laser beam is pointing at.

The geometrical correction means may comprise means for generating a calibration pattern and feeding it to the projector, means for comparing the pattern produced by the video camera with the generated calibration pattern, means for generating a correction to bring the pattern produced by the video camera into conformity with the generated pattern, and means for applying the correction to subsequently displayed images.

The generated pattern may be for example a cross hatch pattern, that is a series of equally spaced vertical and horizontal lines. This is a pattern which is easy to generate and to compare. Clearly any other convenient calibration pattern could be generated and used. If necessary or desired the calibration procedure could be carried out at intervals during the presentation to ensure that no changes had taken place. These may be either at set intervals or on demand. Once the calibration has taken place it is likely to remain stable for a long period as it is primarily a function of the geometry of the system.

The projection display system may include a presentation computer for generating the images to be displayed and presenting them to the projector and an interaction computer for receiving the signal from the video camera and generating control signals for the presentation computer.

The presentation computer and interaction computer may be combined as a single unit. Whether two separate computers are used or a single combined computer will depend on the power and speed of the computer and the acceptable reaction times of the system.

BRIEF DESCRIPTION OF THE DRAWING

The above and other features and advantages of the invention will be apparent from the following description, by way of example, of embodiments of a projection display system according to the invention with reference to the accompanying drawings, in which.

DETAILED DESCRIPTION OF THE PREFERRED EMBODIMENTS

Figure 1:
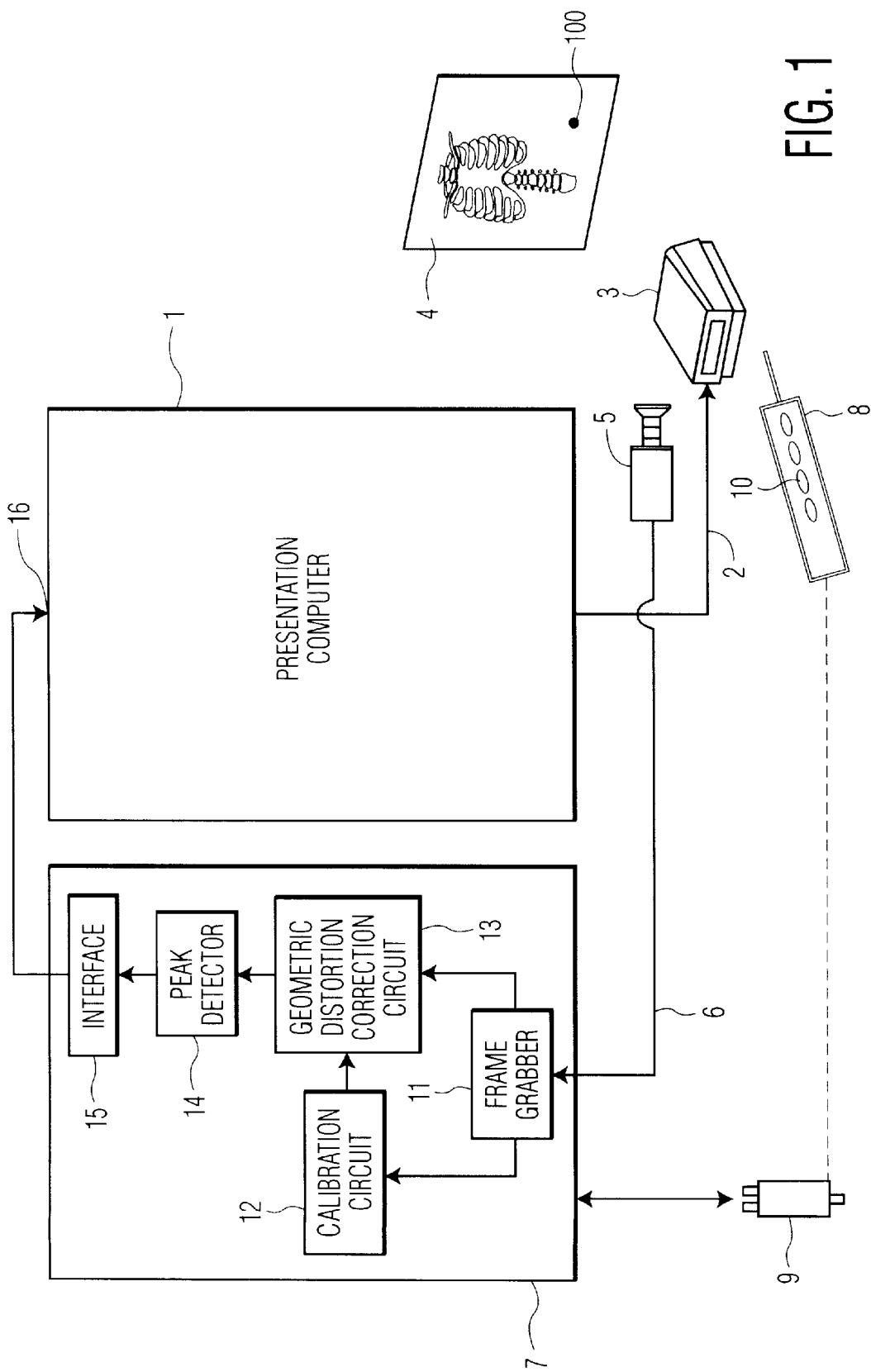
FIG. 1 shows in block schematic form a first embodiment of a projection display system according to the invention.

As shown in FIG. 1 the projection display system comprises a presentation computer 1 which generates images for display and feeds them over a line 2 to a projector 3 which projects the image onto a screen 4. A video camera 5 is arranged to view the screen 4 and produce a signal over a line 6 which is fed to an interaction computer 7. A laser pointer 8 is provided, which is a portable unit which is hand held by the presenter. There is an infra red transmission link from the laser pointer 8 to an infra red receiver 9 which is connected to or formed as part of the interaction computer 7. The laser pointer 8 has four buttons, one of which is shown as reference sign 10. One of the buttons is used to switch the laser pointer on and off and the other three buttons are used to provide a mouse function with their status being relayed to the computer 7 via the infra red transmission link and infra red receiver 9. The interaction computer 7 includes a frame grabber 11 which captures and stores each frame of video information in succession from the camera 5. The interaction computer 7 also includes a calibration circuit 12 which receives a first input from the frame grabber 11 and a second input from the presentation computer 1. The calibration circuit compares the calibration pattern generated by the presentation computer 1 with that viewed by the camera 5 and captured by the frame grabber 11. This comparison produces an output which is representative of the difference between the calibration pattern generated by the presentation computer 1 and the pattern detected by the camera 5 and which is fed to a geometric distortion correction circuit 13 which also forms part of the interaction computer 7. During the calibration process the output of the frame grabber 11 is connected to the calibration circuit 12 but during normal operation the output of the frame grabber 11 is connected to the input of the geometric distortion correct circuit 13 which then takes the image detected by the video camera 5 and corrects the distortion in that image. The output of the geometric distortion correction circuit 13 is fed to a peak detector 14.

The laser pointer 8 produces a spot of light on the screen which is brighter than any other part of the image projected by the projector. In order to enhance the effective greater brightness it is possible and in some instances desirable to include a filter in front of the video camera 5. Thus if a red laser is used a red filter can be placed in front of the lens of the video camera 5. This enhances the brightness of the spot produced by the laser pointer on the screen relative to that of the projected image. Thus the peak detector 14 determines the coordinates of the brightest spot on the screen and transmits this information via an interface 15 to a serial port 16 of the presentation computer 1. The presentation computer 1 may then use this information to generate a cursor which is superimposed on the image projected on to the screen. It can also use this information to determine whether the laser spot is located over a soft button or menu item on the screen and take appropriate action if that is the case. In addition information regarding the operation of buttons on the laser pointer is received by the infra red receiver 9 and passed via the interface 15 and serial input 16 to the presentation computer 1. These buttons can perform the normal mouse functions of a mouse interface with a computer. Thus the orientation of the laser pointer corresponds to the movement of a mouse over a surface while the depressing of the buttons corresponds to pressing the mouse buttons. As a result the presenter may control the presentation computer, in an analogous way to which he would control a desk top computer, by means of the laser pointer.

As an alternative instead of providing the infra red transmission link the buttons 10 could modulate the laser light output and this modulation could be detected by the interaction computer to give the appropriate mouse button commands. This alternative however introduces some delay in carrying out the functions as the time required to detect the modulation may extend over several seconds, whereas the infra red transmission of the button operations can be achieved much more quickly. A further alternative is for the computer to detect that the laser pointer has been pointing at a particular spot on the screen for greater than a given period of time. That is if the laser spot is held on a soft button for say greater than 2 seconds it is assumed that this is a button operation. This again has the disadvantage of requiring a certain time lapse between the desire to perform an operation and it being achieved. In addition the presenter has to ensure that he does not inadvertently cause the laser to hover over a interaction point for longer than the set period.

It can be seen that the interaction computer 7 transmits certain information to the presentation computer 1. This information comprises the absolute X and Y position values of the laser spot on the screen, the mouse button status, and request for calibration pattern display. There may be more than one calibration pattern in which case the interaction computer 7 will not only request the display of a pattern but will also specify which pattern is to be displayed. Where two computers are provided for the presentation computer and the interaction computer it is envisaged that the calibration pattern will be stored in memory in the interaction computer so that no communication from the presentation computer to the interaction computer is required for setting up the calibration.

At present it is desirable to have separate computers for the presentation computer and interaction computer since the speed and power required of a single computer would be not economically available. As an example the presentation computer may be a Sun workstation whereas the interaction computer is a personal computer. If both are combined into a more powerful computer then the interface becomes simpler to handle and no storage of the calibration pattern is required apart from in the calibration pattern generator of the presentation part of the computer.

Figure 2:
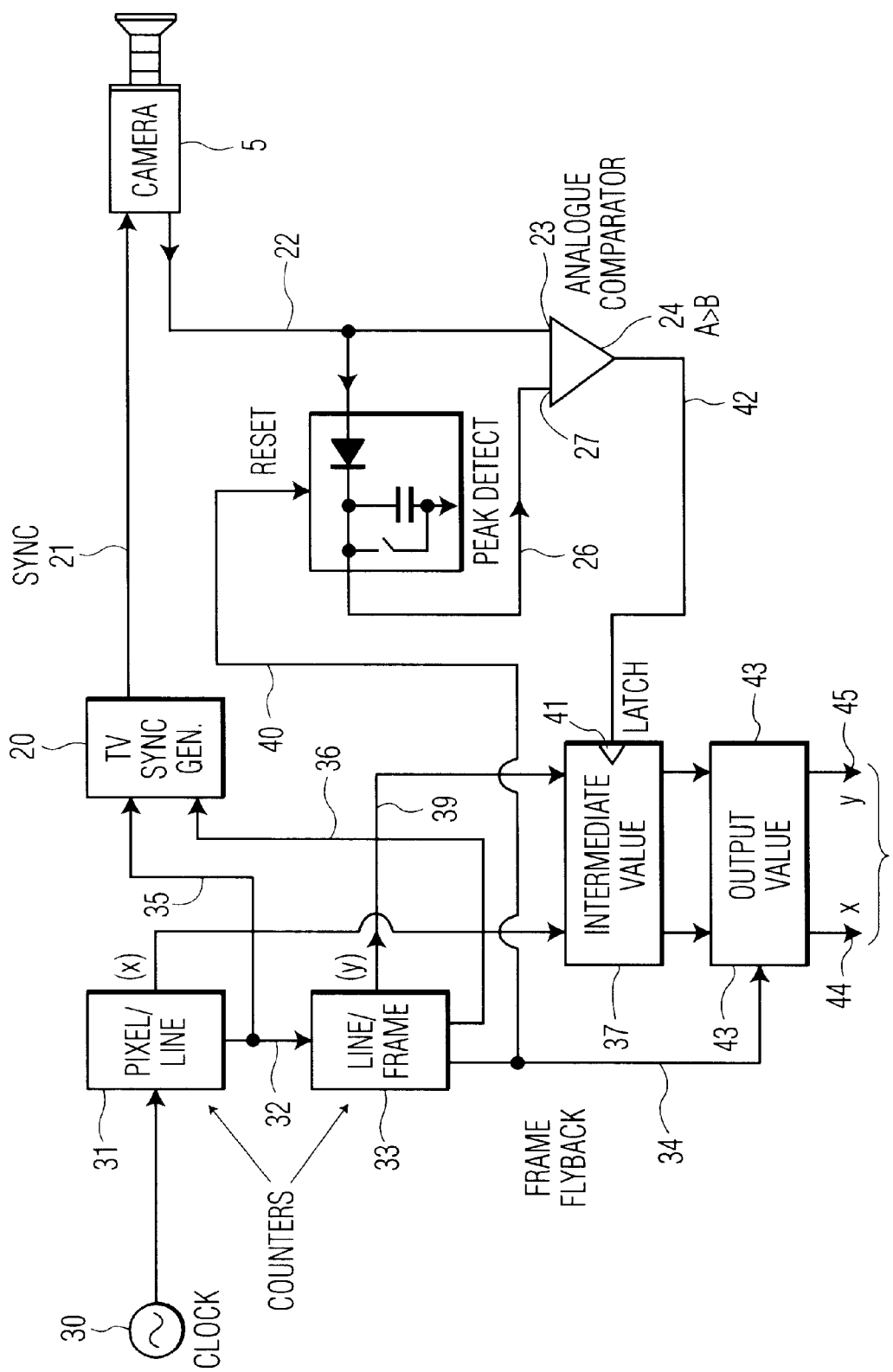
FIG. 2 shows an arrangement for generating the position of the laser spot on the screen.

Various modifications may be made to a system according to the invention. The peak detection may be carried out within the interaction (or single) computer using software algorithms and the peak detection may be carried out either before or after the geometric distortion correction. An advantage of carrying out the peak detection on the raw input data, i.e. before the geometric distortion correction is that only the peak position needs to be corrected, thus simplifying the geometric distortion correction as a full video frame does not have to be corrected. A hardware analogue peak detector, one embodiment of which is shown in FIG. 2 and is described hereinafter may be used instead of a digital peak detector within the interaction computer. In this case the peak detection again takes place before the geometric distortion correciton and consequently the peak position only has to be corrected. This arrangement allows a less expensive frame grabber to be used as only the calibration frames have to be captured for total scene analysis and this can be spread over a number of frames received from the video camerea as it will be a stationary pattern. No video input is required to monitor the pointer position, instead the raw analogue video signal is fed to the peak detector which supplies the computer with the co-ordinates of the peak only, there being no need for the computer to capture the video frames apart from during the calibration process, if implemented.

FIG. 2 shows in block schematic form a hardware arrangement for detecting the position of the peak brightness in the displayed image. As shown in FIG. 2 the camera 5 receives synchronising signals from a synchronisation signal generator 20 over a line 21 and produces an analogue signal over a line 22 which is presented to a first input 23 of an analogue comparator 24. The signal on line 22 is also applied to the input of a peak detector 25.

The output of the peak detector 25 is fed via a line 26 to a second input 27 of the analogue comparator 24. A clock generator 30 produces a clock signal at the pixel rate and this clock signal is counted in a counter 31 which produces an output on a line 32 at line frequency. This output is fed to a second counter 33 which produces an output on line 34 at frame frequency and defines the frame flyback period. A line frequency signal is fed to the synchronisation signal generator 20 from the counter 31 over a line 35 while a field frequency signal is fed to the synchronisation signal generator 20 via a line 36 from the counter 33. The pixel count is fed from the counter 31 to an intermediate value store 37 over a line 38, while a line count is fed to the intermediate value store 37 from the line counter 33 over a line 39. The frame flyback signal is fed to the peak detector 25 over a line 40 as a reset signal for the peak detector 25. The output of the analogue comparator 24 is fed to a latch input 41 of the intermediate value store 37 over a line 42. This signal will cause the current X and Y co-ordinates to be latched into the intermediate value store 37 in terms of pixel number and line number. The value from the intermediate value store 37 is fed to an output value store 43 and is clocked into that store by means of the frame flyback pulse one line 34. The X and Y coordinates of the peak value then become available at output 34 and 45 at the end of each frame period.

In operation the synchronisation signal generator 20 receives signals from the counters 31 and 33 to enable it to synchronise the camera 5 to the system clock. The counters 31 and 33 generate numbers corresponding to the current position (e.g., element 100 in FIG. 1) of the pixel being received from the camera. The peak detector circuit holds the peak value which has previously been detected in the video wave form. This is compared to the current value and if the current value is higher than the previous peak then the current pixel co-ordinates are stored in the intermediate value store 37 replacing the previously stored values. At the end of the frame, that is once the whole picture has been examined, the coordinates of the peak value are transferred into the output value store 43 from whence they can be used by the computer. The peak detector is then reset to a level corresponding to black level before the next frame is received. The peak detector is arranged so that there is a delay through the peak detector such that the current value always reaches the analogue comparator before its value is transferred through the peak detector to the second input of the comparator. This can be achieved in various ways for example by making the peak detector a sample and hold circuit triggered by the comparator or by employing analogue to digital convertors and subsequent digital to analogue conversion. Alternatively the peak detection could be implemented entirely in the digital domain whereby a digital to analogue convertor is inserted between the camera output and both the peak detector 25 and comparator 24. In this case a digital comparator rather than an analogue comparator would be used.

In one embodiment a projection display system according to the invention comprises a red laser pointer with four buttons which is used as a pointing device on a projection screen. The position information as to where the laser pointer is pointed is obtained by locating the light spot on the screen by a camera while three buttons and an infra red transmission link provide full mouse compatibility. The fourth push button switches the laser on. The red light spot is detected by a camera equipped with a red light filter. Since the intensity of the laser light is generally greater than the intensity of video projectors a simple threshold can be used to discriminate the signal of interest in a frame of pixels. This position is transformed into normalised absolute screen co-ordinates which is fed into the computer on which the presentation software is running. The mouse cursor follows the red light laser pointer on the screen and remains at its current position if the laser beam is switched off or is outside the active screen area. Besides the push button to control the laser there are three other buttons required in order to provide full three button mouse compatibility. The state of these buttons is transmitted via an infra red link to the interaction computer and passed on to the presentation computer. Where a mouse cursor is presented on the screen it is possible to use a laser which emits radiation outside visible wavelengths, for example an infra red laser, and this may have advantages in that there can be no confusion between the position of the cursor and the position where the bright light from the laser lands on the screen. These two positions may not be coterminous if there is any distortion between the generation of the screen display by the presentation computer and the projection of that display onto the screen.

From reading the present disclosure, other modifications will be apparent to persons skilled in the art. Such modifications may involve other features which are already known in the design and use of projection display systems and component parts thereof and which may be used instead of or in addition to features already described herein. Although claims have been formulated in this application to particular combinations of features, it should be understood that the scope of the disclosure of the present application also includes any novel feature or any novel combination of features disclosed herein either explicitly or implicitly or any generalisation of one or more of those features which would be obvious to persons skilled in the art, whether or not it relates to the same invention as presently claimed in any claim and whether or not it mitigates any or all of the same technical problems as does the present invention. The applicants hereby give notice that new claims may be formulated to such features and/or combinations of such features during the prosecution of the present application or of any further application derived therefrom.

What is claimed is:

1. A projection display system, comprising:

a projector arranged to project a computer generated image onto a screen, a hand-held pointer capable of producing a beam of visible radiation, a video arranged to view the screen and produce a video signal, and means for analyzing the video signal produced by the camera to determine a point on the screen radiated by the pointer, wherein the pointer has a button for producing a computer input signal that is communicated via a wireless infra red link between the pointer and a computer.

2. A projection display system as claimed in claim 1 in which the pointer is a laser pointer.

3. A projection display system according to claim 1, further comprising a computer being arranged to receive the signal and display a cursor at a determined point on the screen when the button is actuated, wherein the cursor remains at the determined point when the pointer is turn off or is moved to radiate a different point on the screen.

4. A projection display system as claimed in claim 1 including geometrical distortion correction means to correct distortion caused by the projector, screen and video camera.

5. A projection display system as claimed in claim 4 in which the geometrical distortion correction means comprises means for generating a calibration pattern and feeding it to the projector, means for comparing the pattern produced by the video camera with the generated calibration pattern, means for generating a correction to bring the pattern produced by the video camera into a conformity with the generated pattern, and means for applying the correction to subsequently displayed images.

6. A system as claimed in claim 1 including a presentation computer for generating the images to be displayed and presenting them to the projector and an interaction computer for receiving the signal from the video camera and generating control signals for the presentation computer.

7. A system as claimed in claim 6 in which the presentation computer and interaction computer are combined as a single unit.

* * * * *